Sept. 9, 1930. G. W. WATTLES, JR 1,775,415
SAFETY DEVICE FOR AIRPLANES
Filed Feb. 18, 1930 2 Sheets-Sheet 1
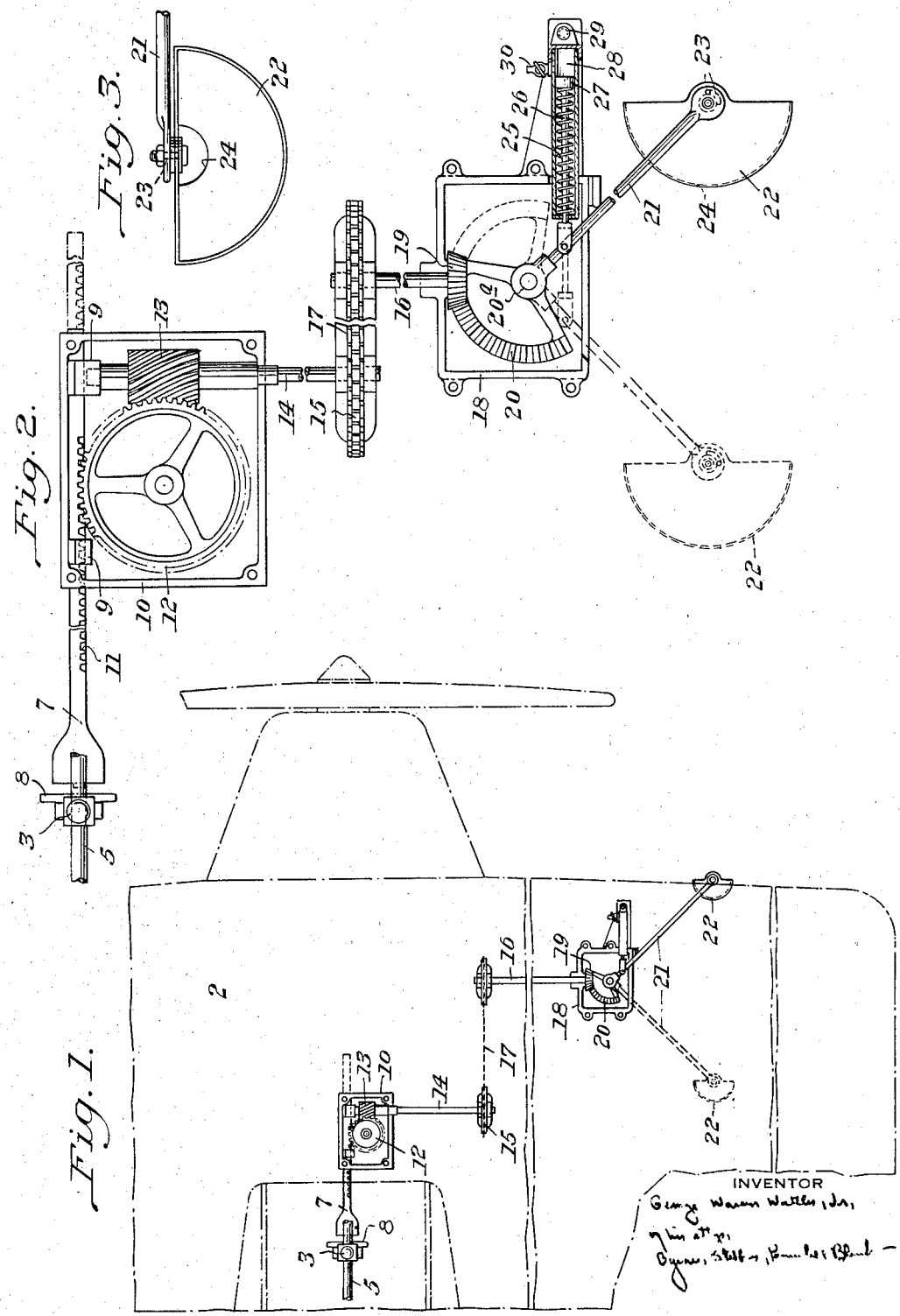

Sept. 9, 1930.    G. W. WATTLES, JR    1,775,415
SAFETY DEVICE FOR AIRPLANES
Filed Feb. 18, 1930    2 Sheets-Sheet 2
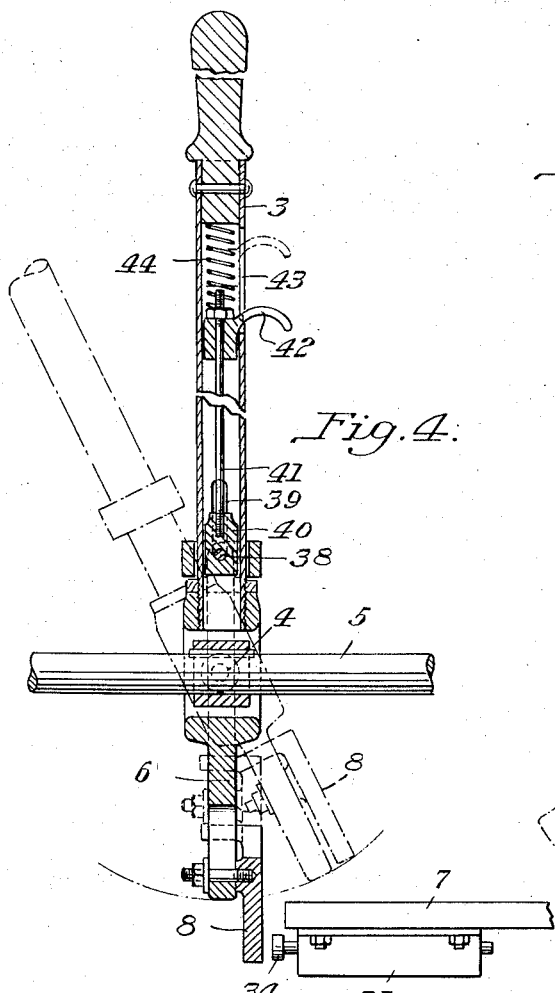
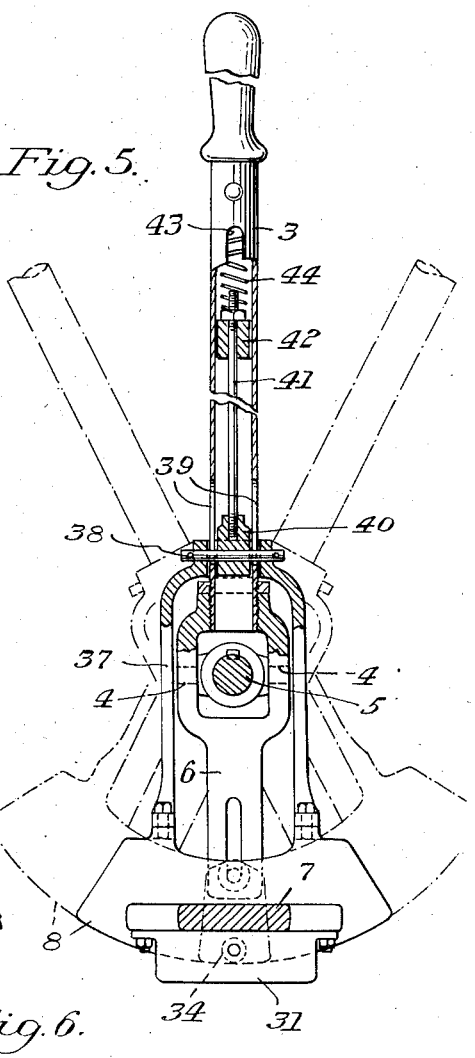
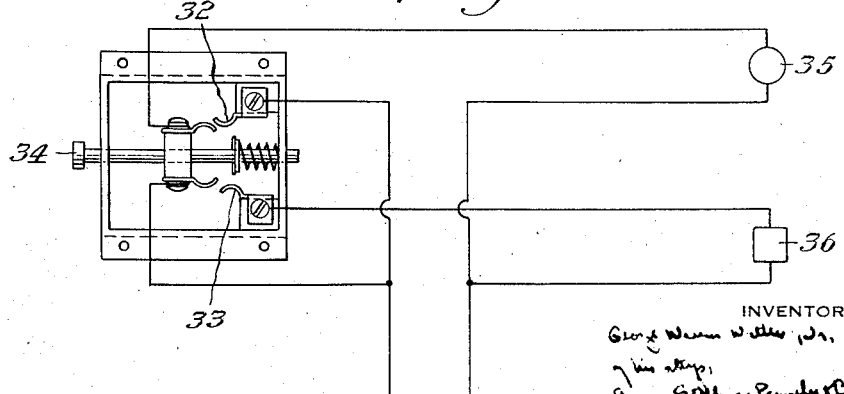
INVENTOR Patented Sept. 9, 1930

1,775,415

UNITED STATES PATENT OFFICE

GEORGE WARREN WATTLES, JR., OF PITTSBURGH, PENNSYLVANIA

SAFETY DEVICE FOR AIRPLANES

Application filed February 18, 1930. Serial No. 429,414.

This invention relates to a safety device for airplanes and provides a mechanism whereby the control of the plane is left with the pilot, but the degree of control is limited in such amount under the conditions obtaining at a given moment as to insure safety.

By far the majority of airplane accidents is caused by spins resulting from the plane losing flying speed. Inexperienced pilots always tend to climb a plane so steeply as to cause stalling, and the danger is particularly marked shortly after taking off, when there is insufficient altitude to pull out of the spin and avert a crash.

Automatic control devices working separately and independently of the pilot's control, are unsatisfactory for numerous reasons. They do not afford immediate knowledge of the condition of the plane, they are heavy and likely to get out of order, and, in many cases, are not only unwieldy but are a menace if an emergency arises and requires unusual maneuvering on the part of the pilot.

I preferably employ a control device adapted for actuation by the operator and limit the range of operation thereof by means of a device responsive to the speed of the plane relative to the air. In the type of control now in general use, a joy stick is employed for controlling the ailerons and elevators. Sidewise movement of the joy stick controls the ailerons, and movement forward and backward controls the elevators. I preferably employ an arm connected through suitable gearing to a wind-responsive device which limits the amount of elevator controlling movement of the joy stick. The wind-responsive device may be in the form of a pivoted arm having a cup thereon, the open side of which cup is directed forwardly. The arm is urged forward by a spring and as the speed of the plane relative to the air increases, the arm is swung backward, thus moving the control arm and enlarging the freedom of movement of the joy stick.

I have found that the device operates best when placed on the underside of a wing and projecting slightly beyond the leading edge when at rest. The speed-responsive device is preferably connected to the control arm through gearing so arranged as to constitute an "irreversible" connection, thus making it impossible for the pilot to actuate the control by mere strength.

Preferably a signal device is employed, this device coming into operation just before the limit of movement of the joy stick is reached. This insures that the situation will be brought home to the pilot, and, if, as is usually the case, he has unconsciously increased the climbing angle of the plane to a point approaching the danger point, he is warned to level off or decrease the climbing angle until speed has again been attained.

In the accompanying drawings illustrating the present preferred embodiment of the invention, Figure 1 is a top plan view of the device as applied to an airplane, the plane being shown in dot and dash lines;

Figure 2 is a view to enlarged scale, partly broken away, showing the control mechanism;

Figure 3 is a front view of the cup which responds to speed changes;

Figure 4 is a longitudinal vertical section through the joy stick showing the mechanism for freeing the stick of the control device;

Figure 5 is a front elevation thereof, partly broken; and

Figure 6 is a wiring diagram.

The airplane is indicated generally in the drawings by the reference character 2, and is provided with a joy stick 3 mounted on trunnions 4 for forward and backward movement to control the elevators. The trunnion member is mounted on a longitudinally extending shaft 5 which is connected to the ailerons. The stick has a downwardly projecting portion 6 and this portion is utilized to effect the desired limitation on the range of operation. The rod connecting the joy stick to the elevator controls is also attached to this downwardly projecting portion, but is omitted from the drawings for purposes of clearness.

There is provided a control arm 7 normally engageable by an arcuate plate 8 which is slidably mounted on the downwardly projecting portion 6 of the joy stick. The control arm 7 is slidable in guides 9 formed in a casing 10 attached to the fuselage. Rack teeth 11 are formed in one side of the arm 7, these teeth being engaged by a spiral gear 12. The spiral gear 12 meshes with a corresponding gear 13 on a shaft 14, which shaft carries a sprocket 15. The sprocket 15 is connected to a sprocket on a shaft 16 through a chain 17. The shaft 16 is carried in a housing 18, secured to the underside of one of the wings. The shaft carries a bevel pinion 19 meshing with a gear segment 20 pivoted in the housing 18 at 20ª. The gear segment 20 carries an arm 21 which, in the solid line position of Figures 1 and 2, projects just beyond the leading edge of the airplane wing and carries a cup 22. The cup is pivotally mounted, but the degree of rotation thereof is limited by a pin and slot connection 23. An opening 24 is provided at the rear of the cup so as to aid in presenting the open side forwardly at all times.

The arm 21 is normally urged to the solid line position by means of a compression spring 25 surrounding a rod 26. A piston 27 is formed in a cylinder 28 which is pivotally connected to the housing 18 at 29. A petcock 30 controls the ingress and egress of air from the cylinder 28, the cylinder mechanism acting as a dash-pot, which limits any tendency of the arm 21 to vibrate under the influence of slight wind gusts.

As the airplane moves forward, the wind pressure on the cup 22 urges the arm backwardly against the compression of the spring 25 in an amount depending on the speed of the airplane relative to the air. This backward movement rotates the shaft 16 and through the sprockets and the gear changes the position of the control arm 7. The greater the speed of the plane relative to the air the further is the control arm 7 retracted, thus giving a degree of freedom of movement of the control stick which varies with the speed.

Referring to Figures 4 and 6 there is shown a switch box 31 containing two switches 32 and 33 which are controlled by a button 34. The switch 32 is arranged in advance of the switch 33, as shown in Figure 6. When the joy stick is pulled backwardly to such a degree that the segment 8 comes close to the control arm 7, the switch button 34 is pushed inwardly, closing the switch 32 and illuminating a signal light 35. If movement of the stick is continued in an amount sufficient to bring the segment into contact with the control arm 7, the switch 33 is closed, thus energizing a high frequency buzzer 36 which gives an audible indication to the pilot.

While it is contemplated that the control will be in operation under all ordinary circumstances, it may some times be desirable to render it ineffective. This is done by raising the segment 8 until it is above the control arm 7, as indicated in dot and dash lines in Figure 4. The segment 8 is secured to a yoke 37 having a cross pin 38 extending through slots 39 in the joy stick and making connection with a cross head 40. A pull rod 41 extends from the cross head to a thumb latch 42 projecting outwardly through a slot 43. When the thumb latch is pulled up to the dot and dash line position of Figure 4, the control device is rendered ineffective. A spring 44 is provided to insure return of the control device to its normal position, and the thumb latch 42 may be held in its upward position by the operator or by a separate locking means, not shown.

While the operation of the device will be clear from the foregoing, a short description of its action when the plane is taking off will be given. With the plane at rest, the cup 22 will be forward in the solid line position of the drawings, and the arm 7 will therefore be in its rearward position, substantially preventing the pilot from pulling the joy stick back. In order to gather speed prior to taking off, he will move the stick forward a short distance, thus raising the tail off the ground. Since such movement causes the downwardly projecting portion 8 of the stick to move backwardly, the arm 7 offers no interference. As speed is gathered, the cup 22 is moved backwardly, retracting the arm 7 and permitting the pilot to pull the stick back, thus depressing the tail and taking off, when and if flying speed is reached. However, the position of the cup will depend on the speed relative to the air since the spring 25 offers a constantly increasing resistance. It is therefore impossible for the pilot to impose too great a climbing angle on the plane and cause a stall.

The device is entirely automatic in operation and does not normally interfere with the free control of the machine by the pilot. It is only when he attempts to climb the plane at too steep an angle that the control device limits his movement. The amount of control exercised over the pilot by the device varies so as to provide the utmost range of freedom consistent with safety at the then speed of the plane. This constitutes a highly important advantage of the invention.

I have illustrated and described a present preferred embodiment of the invention. It will be understood, however, that it is not limited to the form shown but may be otherwise embodied within the scope of the following claims.

I claim:

1. In an airplane, a control means actuated by the pilot, and automatic means directly engaging said control means for limiting the range of operation thereof.

2. In an airplane, a joy stick, and means actuated by air pressure and directly engaging the joy stick for limiting the range of operation thereof.

3. In an airplane having ailerons and an elevator, a device for controlling the ailerons and the elevators and adapted to be actuated by the pilot, and a speed responsive device for limiting the range of elevator controlling movement of said control device while leaving the range of aileron control thereby substantially undisturbed.

4. In an airplane having ailerons and an elevator, a control member adapted to be grasped by the pilot and moved in one direction for controlling the aileron and moved in a second direction for controlling the elevator, and speed-responsive means for limiting the range of movement of said control device in the last mentioned direction.

5. In an airplane, a control mechanism having a portion movable in a defined path, and a speed-responsive device having a portion adapted to lie in the path and engage said portion of the control mechanism so as to limit the range of operation of the control mechanism, said portion of the speed-responsive device being movable out of the path of said portion of the control mechanism when it is desired to render the speed-responsive device ineffective.

6. In an airplane, a control means adapted for actuation by the pilot, and means responsive to the speed of the airplane for limiting the range of operation of the control means, said limiting means including an arm, a cup pivotally mounted to swing relative to the arm so as to present its open side to the wind, and connections with the arm effective upon movement thereof for effecting said limiting of the movement of the control means.

7. In an airplane having a wing, a control means for actuation by the pilot, and limiting means responsive to the speed of the airplane relative to the air for limiting the range of operation of the control means, said limiting means including an element movable under wind pressure, said element being mounted just beneath the wing and movable rearwardly thereunder.

8. In an airplane having a wing, a control means for actuation by the pilot, and limiting means responsive to the speed of the airplane relative to the air for limiting the range of operation of the control means, said limiting means including an element movable under wind pressure, said element being mounted just beneath the wing and movable rearwardly thereunder, said wind-responsive element being mounted on a pivoted arm, the arm having connections for limiting the range of operation of said control means.

In testimony whereof I have hereunto set my hand.

GEORGE WARREN WATTLES, Jr.